US011047209B2

(12) United States Patent
Bowen et al.

(10) Patent No.: US 11,047,209 B2
(45) Date of Patent: Jun. 29, 2021

(54) AUTONOMOUS FLOW CONTROLLER DEVICE

(71) Applicant: Superior Energy Services, LLC, Harvey, LA (US)

(72) Inventors: Eddie Glenn Bowen, Porter, TX (US); Kevin Smith, Klein, TX (US)

(73) Assignee: Superior Energy Services, LLC, Harvey, LA (US)

( * ) Notice: Subject to any disclaimer, the term of this patent is extended or adjusted under 35 U.S.C. 154(b) by 0 days.

(21) Appl. No.: 16/506,703

(22) Filed: Jul. 9, 2019

(65) Prior Publication Data

US 2020/0018136 A1    Jan. 16, 2020

Related U.S. Application Data

(60) Provisional application No. 62/696,620, filed on Jul. 11, 2018.

(51) Int. Cl.
*E21B 34/08* (2006.01)
*E21B 34/14* (2006.01)
*F16K 17/04* (2006.01)

(52) U.S. Cl.
CPC .............. *E21B 34/08* (2013.01); *E21B 34/14* (2013.01); *F16K 17/0493* (2013.01)

(58) Field of Classification Search
CPC ....... E21B 34/08; E21B 34/14; F16K 17/0493
See application file for complete search history.

(56) References Cited

U.S. PATENT DOCUMENTS

| 4,453,599 | A | | 6/1984 | Fredd | |
|---|---|---|---|---|---|
| 4,558,715 | A | | 12/1985 | Walton et al. | |
| 5,435,393 | A | * | 7/1995 | Brekke | E21B 17/18 166/370 |
| 5,526,881 | A | * | 6/1996 | Martin | B21C 37/15 166/205 |
| 6,276,458 | B1 | * | 8/2001 | Malone | E21B 21/10 166/386 |
| 6,405,800 | B1 | * | 6/2002 | Walker | E21B 43/08 166/235 |

(Continued)

OTHER PUBLICATIONS

PCT Application No. US2019/41043; International Search Report and Written Opinion of the International Searching Authority for Applicant Superior Energy Services, LLC dated Sep. 27, 2019.

(Continued)

*Primary Examiner* — Aaron L Lembo
(74) *Attorney, Agent, or Firm* — Jones Walker LLP

(57) ABSTRACT

A flow control valve sub including a tubular valve sub housing having a sub central passage and a valve cavity formed in a sidewall of the sub housing. At least one piston aperture and at least one constant area pilot aperture communicate between the valve cavity and the sub central passage, while a piston is positioned in the piston aperture with the piston moving to at least partially cover and uncover the flow port in order to create a variable flow path between the valve cavity and the sub central passage. A beam spring is supported at a location within the cavity on each side of the piston and biases the piston toward a less flow restrictive position relative to the flow port and a valve cover is positioned to substantially close the valve cavity.

15 Claims, 4 Drawing Sheets

(56) References Cited

U.S. PATENT DOCUMENTS

| | | | |
|---|---|---|---|
| 7,644,758 B2 * | 1/2010 | Coronado | E21B 34/08 |
| | | | 166/205 |
| 7,819,196 B2 * | 10/2010 | Aakre | E21B 43/32 |
| | | | 166/369 |
| 8,607,873 B2 | 12/2013 | Aadnoy | |
| 9,683,429 B2 * | 6/2017 | Mathiesen | G05D 7/0133 |
| 10,358,897 B2 * | 7/2019 | Bowen | E21B 43/084 |
| 10,695,729 B2 * | 6/2020 | Smith | B01F 15/00389 |
| 2004/0200530 A1 * | 10/2004 | Dalton | G05D 7/005 |
| | | | 137/489 |
| 2008/0041580 A1 * | 2/2008 | Freyer | E21B 43/12 |
| | | | 166/193 |
| 2008/0041588 A1 * | 2/2008 | Richards | E21B 43/12 |
| | | | 166/265 |
| 2009/0065199 A1 | 3/2009 | Patel et al. | |
| 2010/0065280 A1 | 3/2010 | Tetzlaff et al. | |
| 2011/0198097 A1 | 8/2011 | Moen | |
| 2014/0076540 A1 | 3/2014 | Kang et al. | |
| 2015/0053420 A1 | 2/2015 | Fripp et al. | |
| 2017/0044868 A1 | 2/2017 | van Petegem et al. | |
| 2017/0107791 A1 | 4/2017 | Nguyen | |
| 2020/0003034 A1 * | 1/2020 | Ismail | E21B 34/08 |

OTHER PUBLICATIONS

"UniFlo AFD Inflow Control Screen" brochure published Apr. 2013 (pp. 1-6).

* cited by examiner

AUTONOMOUS FLOW CONTROLLER DEVICE

CROSS-REFERENCE TO RELATED APPLICATION

This application claims the benefit under 35 USC § 119(e) of U.S. Provisional Application Ser. No. 62/696,620, filed Jul. 11, 2018, which is incorporated by reference herein in its entirety.

BACKGROUND OF INVENTION

This application relates to fluid flow control devices and in particular embodiments, devices for controlling fluid flow into and out of tubular members positioned within hydrocarbon producing wells.

Often when producing hydrocarbons from wells, particularly horizontal wellbores, the wellbore extends through a number of separate hydrocarbon-bearing production zones. Each of the separate production zones can have distinct characteristics such as pressure, porosity and other factors which can contribute to unequal and undesirable production patterns across the different zones. Additionally, the same zone may have different flow characteristics over the life of the well.

One technology that has been developed to manage the inflow of fluids from various production zones involves the use of downhole inflow control tools, including those sometimes referred to as inflow control devices ("ICDs"). ICDs are disposed in production tubing along the horizontal bore and can be used to cause equal contribution from each zone, either in production or injection phases. ICDs can be hydraulically, pneumatically, electrically, optically, magnetically, and/or mechanically operated to selectively permit and prevent fluid flow into or out of the tubing string. However, individual control of multiple ICDs can require several control lines to each ICD, additional trips into the wellbore to operate individual ICDs (e.g., sliding sleeve valves, rotary actuated valves, etc.), and the ICDs may require more complex components, leading to a higher risk of failure.

It would be advantageous to have a comparatively simple and reliable autonomous ICD (AICD) type device which autonomously maintains a constant flow rate throughout each device even where reservoir heterogeneities and varying fluid properties exist throughout the zone of interest.

SUMMARY OF SELECTED EMBODIMENTS OF INVENTION

One embodiment of the invention is an inflow control valve sub. The sub is formed of a tubular valve sub housing including a sub central passage and a valve cavity formed in a sidewall of the sub housing. Within the valve cavity is an autonomous inflow control device or AICD which may sometimes be referred to as an "autonomous flow controller device" or "AFD." The inflow control valve includes at least one piston aperture and at least one pilot aperture communicating between the valve cavity and the sub central passage. A piston is positioned in the piston aperture, the piston moving to at least partially cover and uncover at least one flow port in order to create a variable flow path between the valve cavity and the sub central passage. A beam spring is supported at a location within the cavity on each side of the piston and biasing the piston toward a less flow restrictive position relative to the flow port. Lastly, a valve cover substantially seals against the valve cavity while also permitting cavity access for onsite adjustability prior to installation.

Another embodiment of the invention is the flow control valve itself, e.g., independent of the sub housing. The valve includes a valve body configured for insertion in the valve sub sidewall to create a flow path between a central passage of the valve sub tubular member and the cavity, with a flow port formed in the valve body. A valve piston is positioned in the valve body and configured to cover a variable area of the flow port. A beam spring is attached to the valve piston, the beam spring is supported at a location on each side of the valve piston and biases the valve piston to cover a smaller area of the flow port. Lastly, the valve includes a constant area pilot aperture creating a second flow path to the central passage of the sub housing, the pilot aperture being positioned proximate to, but separate from, the valve body.

Still other embodiments are described herein and/or will apparent from the following detailed disclosure.

DETAILED DESCRIPTION OF SELECTED EMBODIMENTS

Figure 1:
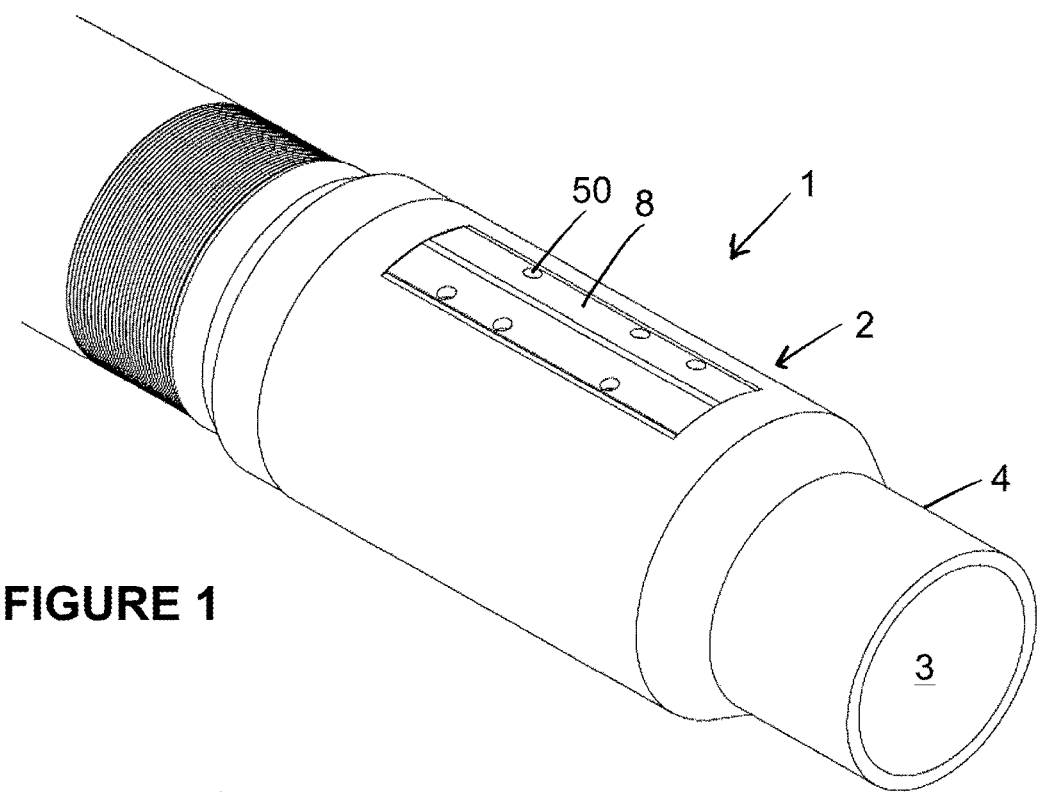
FIG. 1 is a perspective view of an inflow control sub having covers positioned over the inflow control device.
Figure 2:
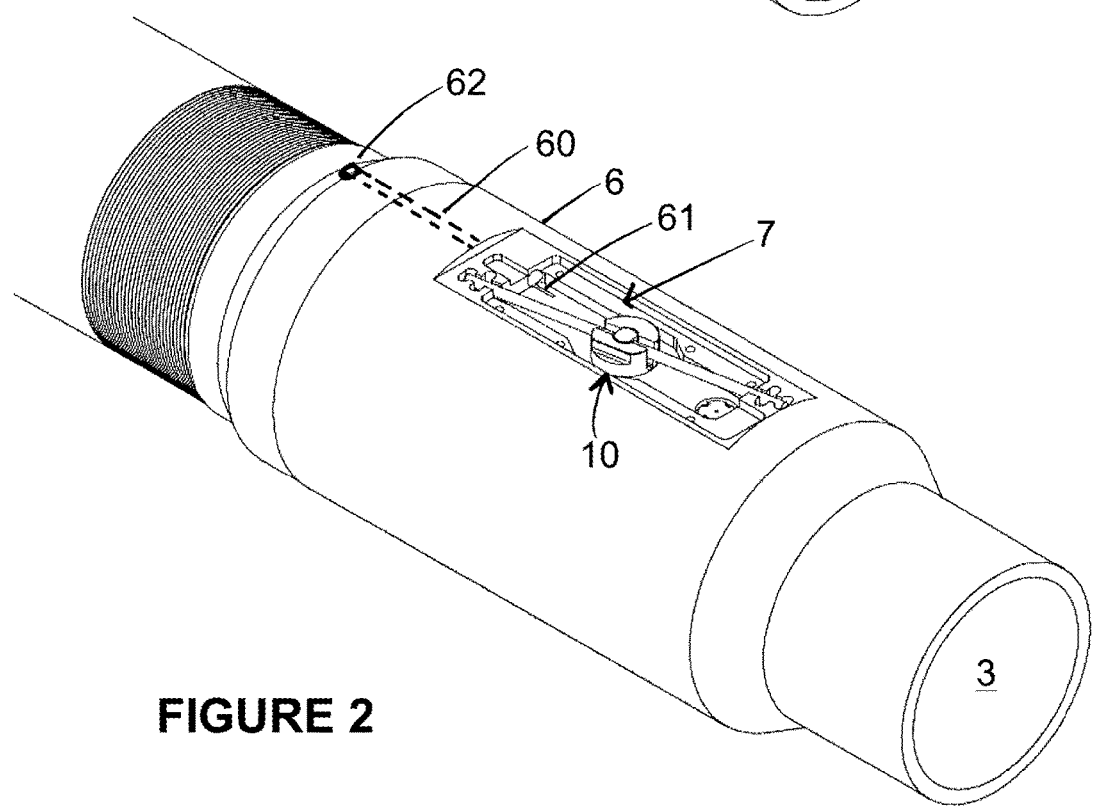
FIG. 2 is a perspective view of the FIG. 1 device, but with the covers removed to show the inflow control device.
Figure 3:
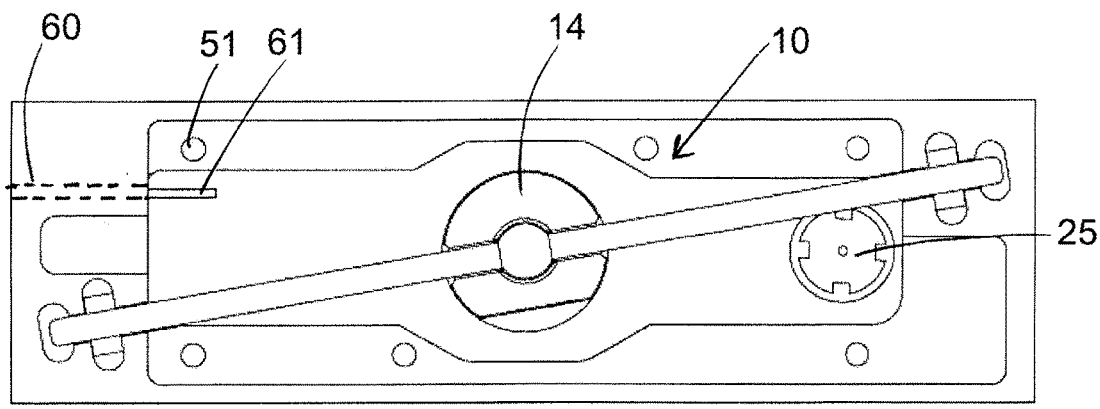
FIG. 3 is a top planner view of the FIG. 1 inflow control device.

FIGS. 1 and 2 illustrate one embodiment of the present invention, flow control valve sub 1. Valve sub 1 generally includes the tubular valve sub housing 2 which has a sub central passage 3 surrounded by the housing sidewall 6. While the diameter of central passage could vary considerably among different applications, more common central passage diameters will range from about 2 inches to about 7.5 inches. The housing sidewall will have a thickness sufficient to accommodate the wall cavity or compartment 7. Example thicknesses of housing sidewall 6 ranges from about 0.37 inches to about 1.5 inches. FIG. 2 suggests how the wall cavity 7 will house the components of flow control valve 10 while FIG. 1 illustrates how the cavity covers 8 will be placed over and enclose cavity 7. In preferred embodiments, covers 8 are machined with a tight tolerance to cavity 7. Covers 8 will not be fluid tight, but will prevent fine solids (e.g., sand larger than 44 um) from entering cavity 7. Covers 8 have screw apertures 50 to receive screws that will thread into the screw bores 51 (see FIG. 3) formed along the edges of cavity 7. FIGS. 2 and 3 suggest how a flow path extends from inflow inlet 62, along inflow path 60 within sidewall 6, to the inflow outlet 61 in cavity 7. As explained below in more detail in reference to FIG. 8, inflow path 60 is the primary manner by which formation fluids reach cavity 7 and inflow control valve 10.

Figure 4:
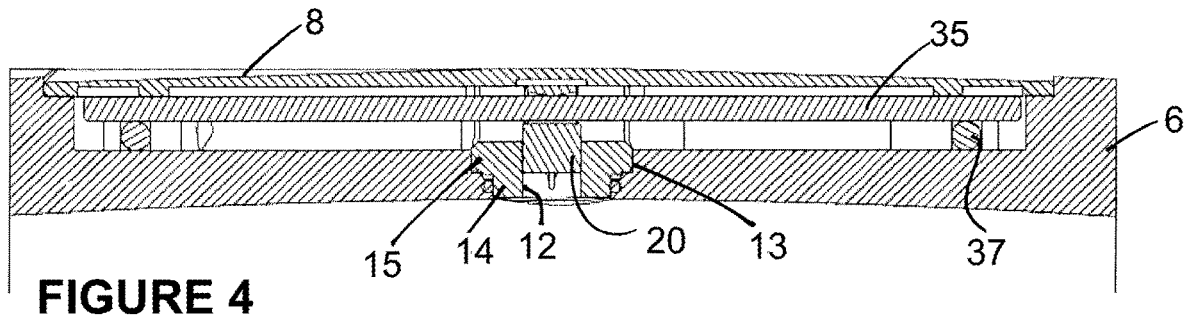
FIG. 4 is a cross-sectional view of the FIG. 1 inflow control device.
Figure 5:
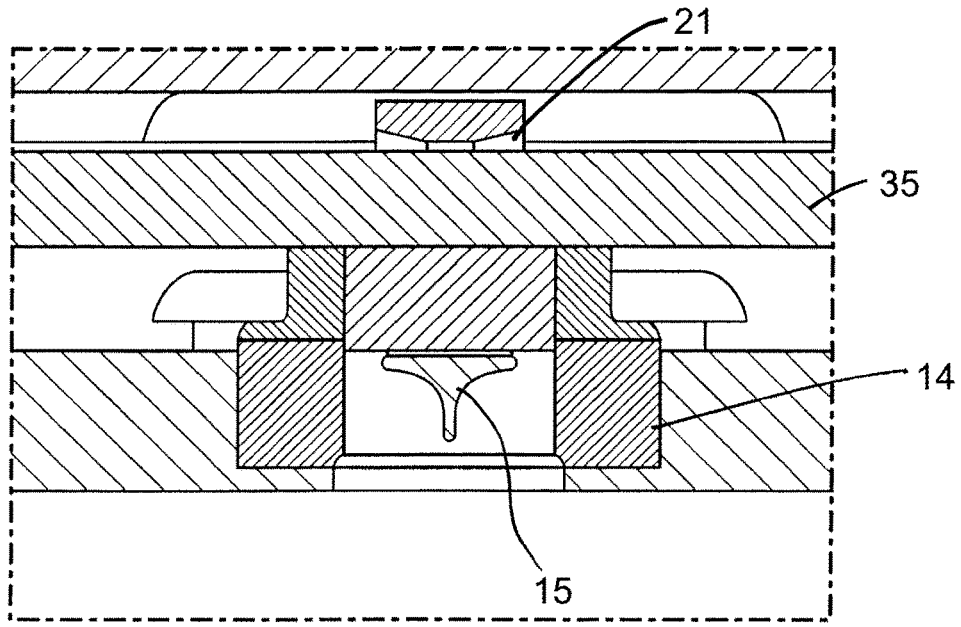
FIG. 5 is an enlarged cross-sectional view of the valve body and piston of the inflow control device.
Figure 6:
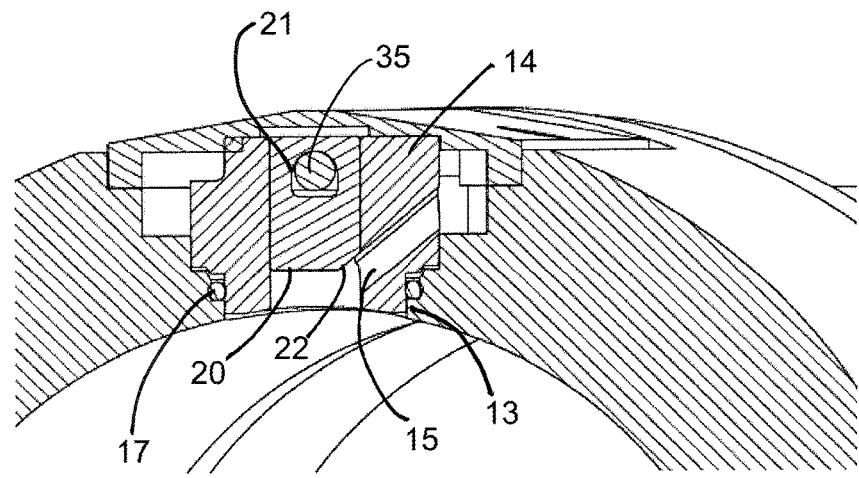
FIG. 6 in another cross-sectional view of the valve body and piston of the inflow control device.
Figure 7:
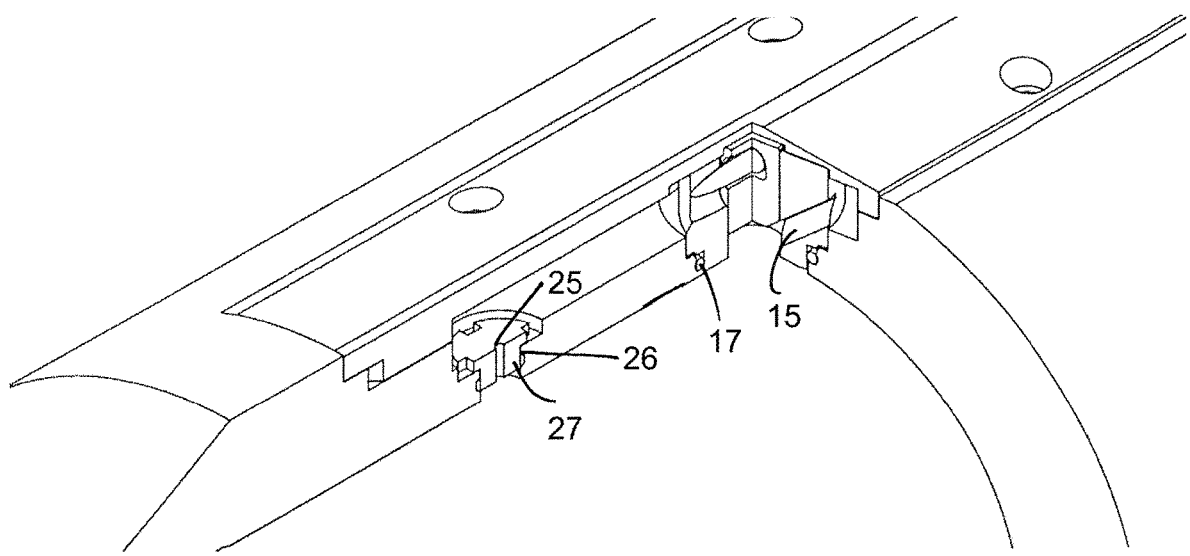
FIG. 7 is a perspective sectional view of the pilot aperture of the inflow control device.

FIGS. 3 to 5 more clearly show the components forming flow control valve 10. Two apertures will extend through the bottom of cavity 7 to create flow paths from the interior of cavity 7 to central passage 3 of the sub housing. The first of these apertures is flow port 15 formed in valve body 14 and the second is pilot aperture 25 (best seen in FIG. 7). In the illustrated embodiment, piston aperture 12 is formed through the center of valve body 14. Valve body 14 itself sits inside valve body bore 13 formed through the wall of sub housing 2 with a seal 17 (see FIG. 6) between valve body 14 and valve body bore 13. As perhaps best seen in FIGS. 5 and 6, the flow port 15 is formed through the wall of valve body 14 such that the movement of piston 20 in valve body 14 tends to cover and uncover flow port 15 in order to create a variable area flow path between the interior of cavity 7 and the sub central passage 3. It will be understood that in many embodiments, by machining a close tolerance between valve body bore 13 and valve body 14, valve body 14 fits tightly within valve body bore 13 without threading or other more elaborate fixation methods. This allows alternative valve bodies 14 having different flow port 15 configurations to be quickly substituted under field conditions in the same sub housing 2. In the embodiment of FIG. 6, the path of flow port 15 through the wall of valve body 14 is sloped downward. In such embodiments, the slope of the flow port is between about 25° and 65° (or any subrange in between) with respect to the radial axis intersecting the center point of the central passage 3 and the piston 20. In certain preferred embodiments, the shape of the flow port 15 will generally be "T-shaped" such that the initial movement of the piston ("downward" or radially inward toward the central passage 3) covers a greater area of flow port 15 than the final extent of piston downward movement. Similarly, it can be seen that the T-shaped flow port provides a nonlinearly increasing flow area as the valve piston moves "upward" uncovering more of the flow port. As one non-limiting example, the T-shaped flow port of FIG. 5 may be defined by utilizing computational fluid dynamics (CFD) numerical simulation modeling which takes into consideration empirical results from flow performance to calibrate a CFD numerical simulator with actual flow testing results.

In one preferred embodiment most clearly seen in FIG. 6, the lower portion of piston 20 facing flow port 15 (e.g., the lower 10-50% of the piston 20) has an inclined surface 22. The inclined surface 22 is sloped from the outer surface of the piston in a direction toward a center line of the piston and downward toward the central passage of the sub housing, i.e., radially inward. In the illustrated embodiment, the slope of inclined surface 22 of piston 20 is approximately equal the slope of flow port 15 through the wall of valve body 14.

Piston 20 is generally biased in a direction (e.g., radially outward in the Figures) for which a greater area (as opposed to a lesser area) of flow port 15 is uncovered by piston 20. In other words, piston 20 is biased toward a less flow restrictive position relative to the flow port. One means for biasing piston 20 is with the beam spring 35 as seen in the Figures. In the illustrated embodiment, beam spring 35 is a rod spring formed of Elgiloy alloy having a circular cross-section between about 0.20 and about 0.25 inches in diameter. Beam spring 35 is connected to piston 20 by extending through the spring aperture 21 in piston 20 and is supported at or near the beam's ends on the beam supports 37, which in the illustrated embodiment, are short sections of rod similar in diameter to the rod spring. The amount of force necessary to deflect beam spring 35 and allow piston 20 to cover more area of flow port 15, will be governed by factors such as the material forming beam spring 35, the thickness of the beam, and the span of the beam between the beam supports 37. In example embodiments where piston 20 has a diameter of between approximately 0.4875 and 0.5125 inches, beam spring 35 will reach the end of the piston's travel across the flow port 15 after about 0.18 to 0.25 inches depending on the flow rate design (although other examples could include anywhere from 0.10 to 0.50 inches of piston travel). The force on piston 20 is a result of the pressure differential across the piston caused by cavity 7 fluid pressure acting on the top of piston 20 and any reduced pressure in central passage 3 (e.g., as a result of fluid in central passage 3 being pumped to the surface). In many embodiments, the beam spring is configured such that piston 20 initiates its travel and ends its travel at fluid pressure differentials across piston 20 ranging from about 15 psi to about 1000 psi (or any subrange in between). Similarly, many embodiments of the beam spring have a spring constant between about 250 lbs/in and about 750 lbs/in (or any subrange in between), with about 500 lbs/in being one preferred spring constant value. Naturally, a "beam spring" may have many different cross-section shapes other than round, e.g., square, rectangular, or elliptical. Likewise, the beam need not be a solid section of material, but could be formed of layers such as a conventional leaf spring. Any material arranged in a supported beam configuration to provide a biasing force could be considered a "beam spring." Similarly, an elongated section of material engaging the piston 20 and being supported at one end in a cantilever configuration could also be considered a "beam spring."

As suggested above, the pilot aperture 25 (also sometimes referred to as a "bypass port") forms a second flow path between the interior of cavity 7 and central flow passage 3 of sub housing 2. The pilot aperture is a constant area opening and should not vary in area during normal operation of the valve. As perhaps best seen in FIG. 7, a preferred embodiment of pilot aperture 25 is formed in the pilot insert 27 which may be threaded into the pilot bore 26 formed in sidewall 8 of sub housing 2. As with valve body 14's port size and piston diameter, different pilot inserts will have different diameter pilot apertures 25. As explained in more detail below, by adjusting parameters such as pilot aperture diameter, flow port area, piston diameter, and beam spring force, a user may configure different pressure/flow rate relationships through inflow control valve 10. In many embodiments, the pilot aperture 25 has a much smaller area than flow port 15, for example, between two and eight times smaller, or more preferably, between three and five times smaller. Although the illustrated embodiment shows only a single flow port 15 and a single pilot aperture 25, other embodiments could include more than one of either or both of flow port 15 and pilot aperture 25.

Figure 8:
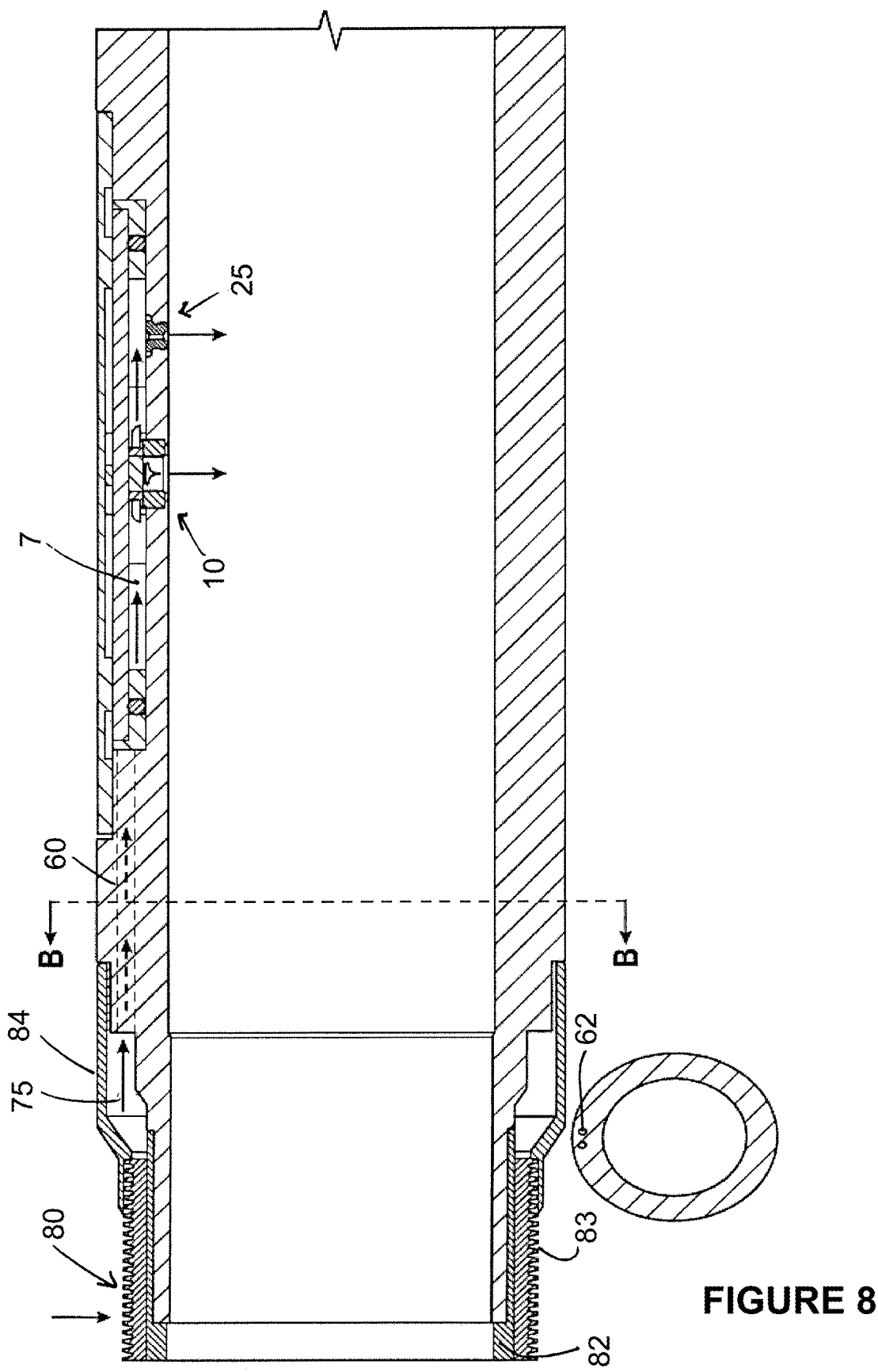
FIG. 8 is cross-sectional view of the inflow control sub connected to a screen sub.

One potential use of flow control valve sub 1 is in combination with conventional "screen subs" such as suggested in FIG. 8. FIG. 8 illustrates one end of a conventional screen assembly or screen sub 80 often used in oil and gas completion operations. The screen sub 80 (also sometimes referred to as a screen "joint") typically comprises a "base pipe" 82 (without perforations) with a filter media (or simply "screen") 83 positioned around, or directly to the base pipe. An annular space between the base pipe 82 and screen material 83 forms a flow path 75 for fluids exiting from the hydrocarbon formation and flowing beneath the screens along the base pipe. A screen connector 84 completes the passageway from sub-screen flow path 75 to the inflow inlet 62 formed in sub housing 2. As suggested by the flow arrows in FIG. 8, the fluid entering from the screen sub moves through the sub housing 2 until it enters the cavity 7 via inflow outlet 61 (see FIG. 2). As fluid fills cavity 7, it begins entering sub housing central passage 3 through both flow port 15 and pilot aperture 25. At a given design fluid pressure in cavity 7, for example a differential pressure (delta P) across flow port 15 of over 15 psi, a first steady state flow rate will be established through the combined areas of flow port 15 and pilot aperture 25. As the differential pressure across fluid passage 15 in cavity 7 increases, this will tend to lower piston 20 in valve body 14, thereby decreasing the available area for flow through flow port 15, while at the same time permitting a constant flow rate through the combination of regulated flow area in flow port 15 and constant area pilot aperture 25. Thus, the total flow rate into sub housing central passage 3 remains relatively constant even though flow and pressure changes are occurring in the wellbore zone where the inflow valve sub is positioned. Likewise, if the wellbore pressure then decreases, piston 20 tends to move upward in valve body 14, uncovering more of flow port 15 and allowing a greater volume of flow through flow port 15, even as there is less flow through pilot aperture 25. Again keeping the flow rate into central passage 3 comparatively constant. Thus, it will be understood that as the reservoir pressure decreases over time due to depletion, and while there remains enough pressure in the reservoir to generate the required operating pressure differential across the inflow control valve assembly, then the inflow control valve will continue to operate at the design flow rate. This is achieved by maintaining the defined constant flow rate through flow port 15 even though there is less pressure in the reservoir.

It can be envisioned how providing different valve bodies 14 with different area flow ports 15 and different pilot inserts 27 with different area pilot apertures 25, allows flow control valve 10 to provide a substantially constant inflow rate for an estimated pressure ranged expected to be encountered in the relevant production zone. As a non-limiting example, Table 1 below provides one illustration of how for a given design flow rate (i.e., 5 gpm in this example), the change in pressure will affect the area of flow port 15 and thus the total flow area available at given pressure ranges. Those skilled in the art can readily determine a flow port area and pilot aperture area needed to accommodate different flow rates and pressure ranges, e.g., through CFD simulations.

TABLE 1

| psi | Area of Pilot Aperture | Area of Variable Flow Port | Total Flow area |
|---|---|---|---|
| 600 | 0.006902908 | 0.000612 | 0.007514908 |
| 500 | 0.006902908 | 0.000612 | 0.007514908 |
| 450 | 0.006902908 | 0.000612 | 0.007514908 |
| 400 | 0.006902908 | 0.001593 | 0.008495908 |
| 350 | 0.006902908 | 0.002595 | 0.009497908 |
| 300 | 0.006902908 | 0.003546 | 0.010448908 |
| 250 | 0.006902908 | 0.004841 | 0.011743908 |
| 200 | 0.006902908 | 0.006646 | 0.013548908 |
| 150 | 0.006902908 | 0.009159 | 0.016061908 |
| 100 | 0.006902908 | 0.01264 | 0.019542908 |
| 50 | 0.006902908 | 0.016968 | 0.023870908 |
| 0 | 0.006902908 | 0.021524 | 0.028426908 |

The particular examples shown herein are by way of example and for purposes of illustrative discussion of certain (sometimes preferred) embodiments of the present disclosure and are presented to assist in understanding the principles and conceptual aspects of various embodiments of the disclosure. In this regard, no attempt is made to show structural details of the disclosure in more detail than is necessary for the fundamental understanding of the disclosure and to allow those skilled in the art to make and use the embodiments without undue experimentation.

The term "about" will typically mean a numerical value which is approximate and whose small variation would not significantly affect the practice of the disclosed embodiments. Where a numerical limitation is used, unless indicated otherwise by the context, "about" means the numerical value can vary by +/−5%, +/−10%, or in certain embodiments +/−15%, or even possibly as much as +/−20%. Similarly, "substantially" will typically mean at least 85% to 99% of the characteristic modified by the term. For example, "substantially all" will mean at least 85%, at least 90%, or at least 95%, etc.

The invention claimed is:

1. A valve sub comprising:
  (a) a tubular member including a sidewall enclosing a central passage and a valve compartment formed in the sidewall,
  (b) a flow control valve positioned in the valve compartment, the flow control valve comprising:
    (i) a valve body configured for insertion in a first bore in the tubular member sidewall to create a first flow path between the central passage of the tubular member and an interior space of the compartment;
    (ii) a flow port formed in the valve body;
    (iii) a valve piston positioned in the valve body and configured to cover a variable area of the flow port, wherein the flow port has an approximate T-shape providing a nonlinearly increasing flow area as the valve piston uncovers the flow port;
    (vi) a rod spring attached to the valve piston, the rod spring being supported at a location within the valve compartment on each side of the valve piston and biasing the valve piston to cover a smaller area of the flow port, wherein (1) the rod spring has a spring constant of between 300 lbs/in and 700 lbs/in, and (2) the rod spring extends through an aperture in the valve piston;
    (v) a constant area pilot aperture creating a second flow path to the central passage of the tubular member, wherein (1) the pilot aperture positioned within the compartment, and (2) the pilot aperture is formed in a pilot aperture body and the pilot aperture body is threaded into a second bore formed in the tubular sidewall; and
  (c) a valve cover substantially enclosing the valve compartment.

2. The valve sub of claim 1, wherein the valve body includes a slot in which the rod spring can deflect in order for the piston to cover a greater area of the flow port.

3. The valve sub of claim 1, wherein a portion of the valve piston facing the flow port has an inclined surface, the inclined surface being sloped from an outer surface of the valve piston in a direction toward a center line of the valve piston and toward the central passage of the tubular member.

4. The valve sub of claim 1, wherein the rod spring has a round cross-section.

5. The valve sub of claim 1, wherein the valve piston is configured to allow fluid flow from the compartment to the central passage while fluid is flowing through the pilot aperture from the compartment to the central passage.

6. The valve sub of claim 1, wherein the valve piston moves radially inward toward the central passage in order to cover the flow port.

7. A valve sub comprising:

(a) a tubular valve sub housing including a sub central passage;

(b) at least one piston aperture and at least one constant area pilot aperture between an exterior of the sub housing and the sub central passage;

(c) a piston positioned in the piston aperture, the piston moving radially toward and away from the central passage in order to at least partially cover and uncover at least one flow port in order to create a variable flow path between the exterior of the sub housing and the sub central passage;

(d) a beam spring supported on each side of the piston and biasing the piston toward a less flow restrictive position relative to the flow port; and (e) wherein fluid flows through the flow port from the exterior of the sub housing to the central passage while fluid also flows through the pilot aperture from the exterior of the sub housing to the central passage.

8. The valve sub of claim 7, wherein the beam spring is a rod spring having a round cross-section.

9. The valve sub of claim 8, wherein the sub housing includes a slot in which the rod spring can deflect in order for the piston to cover a greater area of the flow port.

10. The valve sub of claim 7, wherein a portion of the piston facing the flow port has an inclined surface, the inclined surface being sloped from an outer surface of the piston in a direction toward a center line of the piston and toward the central passage of the tubular valve sub housing.

11. The valve sub of claim 7, wherein the flow port has an approximate T-shape providing a nonlinearly increasing flow area as the piston uncovers the flow port.

12. The valve sub of claim 7, wherein a valve compartment is formed in a sidewall of the valve sub housing and the beam spring is positioned within the valve compartment.

13. The valve sub of claim 7, wherein the beam spring has a spring constant of between 300 lbs/in and 700 lbs/in.

14. The valve sub of claim 7, wherein the pilot aperture is formed in a pilot aperture body and the pilot aperture body is threaded into a bore formed in a sidewall of the sub housing.

15. The valve sub of claim 12, wherein a cover is positioned over the valve compartment.

* * * * *